N. C. BEMENT.
AXLE.
APPLICATION FILED NOV. 15, 1920.
1,418,613.
Patented June 6, 1922.
2 SHEETS—SHEET 1.
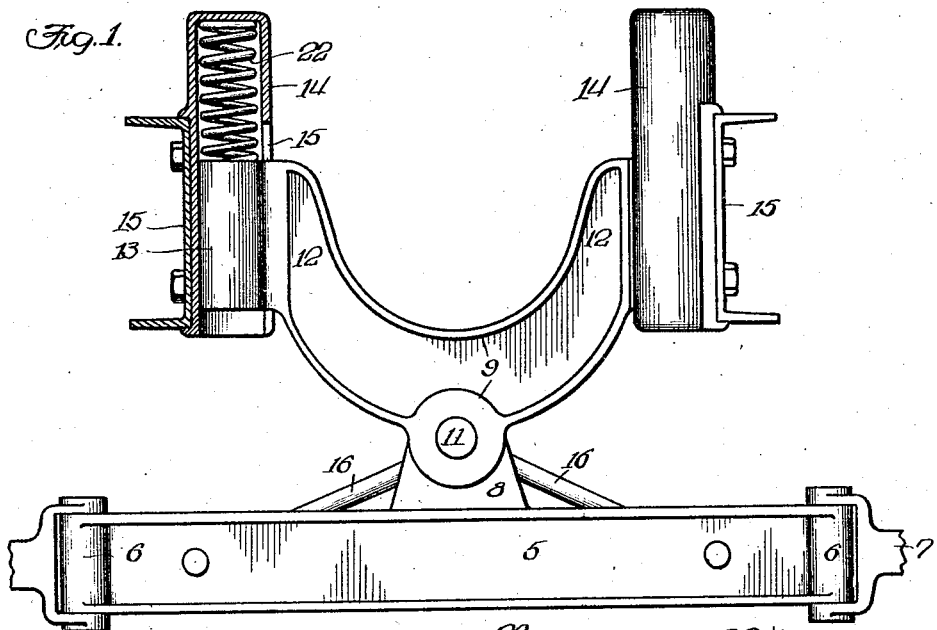
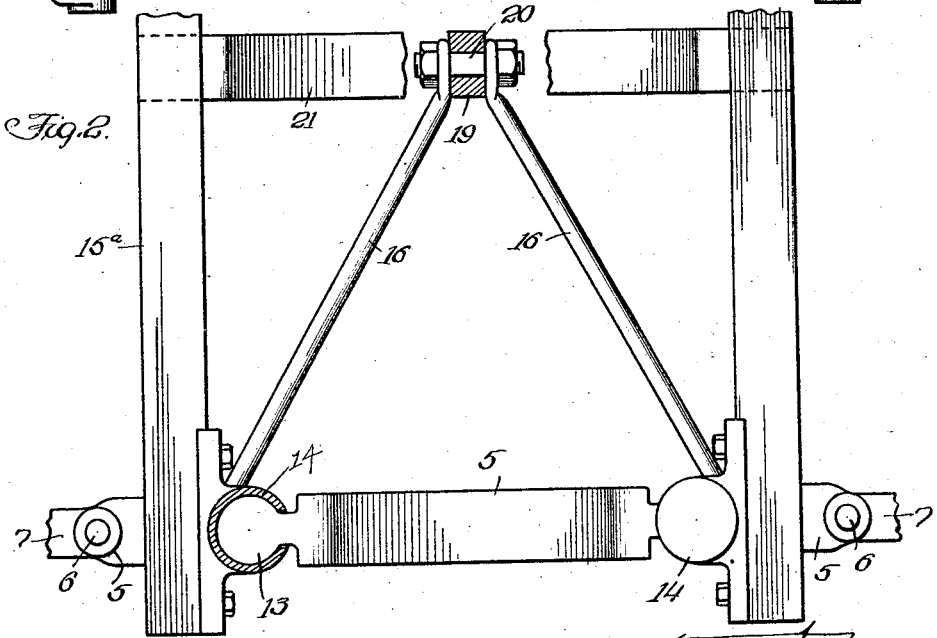

N. C. BEMENT.
AXLE.
APPLICATION FILED NOV. 15, 1920.
1,418,613.
Patented June 6, 1922.
2 SHEETS—SHEET 2.
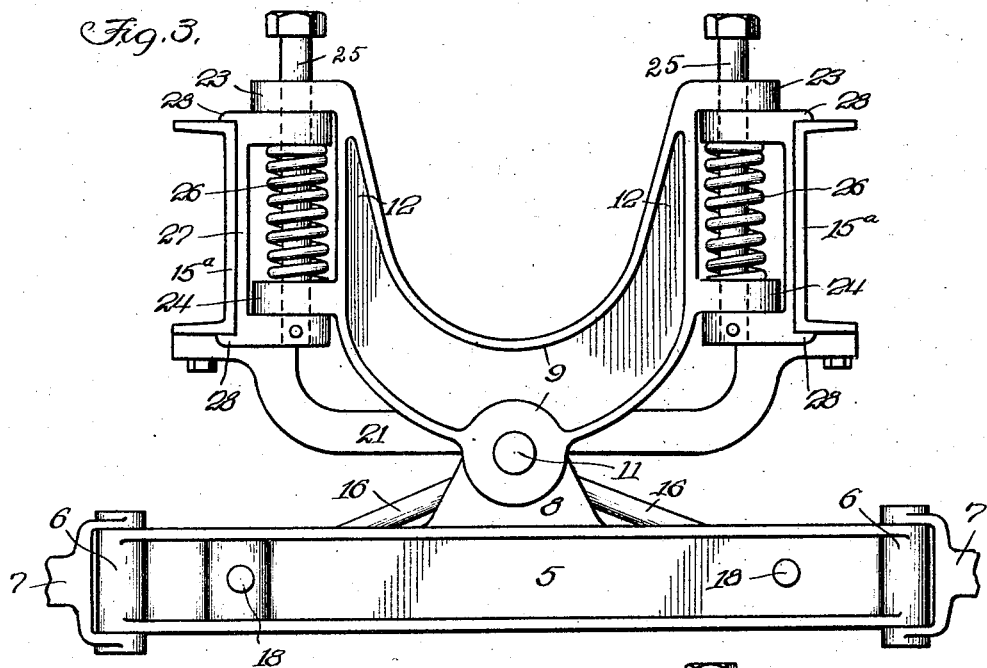
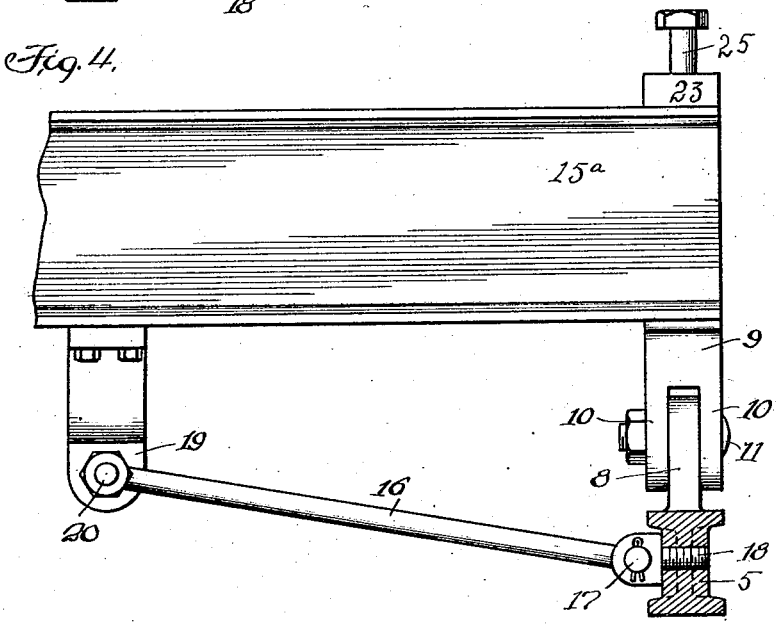

UNITED STATES PATENT OFFICE.

NAHUM C. BEMENT, OF ROCKFORD, ILLINOIS.

AXLE.

1,418,613.  Specification of Letters Patent.  Patented June 6, 1922.

Application filed November 15, 1920. Serial No. 424,047.

*To all whom it may concern:*

Be it known that I, NAHUM C. BEMENT, a citizen of the United States, residing at Rockford, Winnebago County, Illinois, have invented certain new and useful Improvements in Axles, of which the following, taken in connection with the drawings, is a description.

My invention has for its object the production of an axle and spring bearing support designed to be used on motor vehicles, more particularly those known as tractors.

The principal object of my invention is the provision of means for supporting the tractor body, or that part of the tractor body directly above the front axle which carries the engine, and enables it to maintain itself in a horizontal plane regardless of whether the tractor is moving over a smooth or rough surface on the roadway or in field work.

A further object of my invention is to provide resilient members upon each side of a central bearing whereby any shock from uneven tread surfaces may not be transmitted to the operative mechanism of the engine.

It is also an object of my invention to provide a central pivotal bearing for the supporting casting maintaining the tractor body, which enables it to readily adjust itself to different positions.

A further object of the invention is to provide brace bars extending from the outer extremities of the axle to a point beneath the rear of the engine body whereby the weight of the construction and the pulling force is distributed over a larger surface area than has heretofore been possible.

In the accompanying drawings I have illustrated mechanism embodying my invention; the mechanism shown however, does not illustrate all of the forms in which the principle of the invention may be applied.

In these drawings:

Fig. 1 is a front elevation of an axle and a bearing partly in section,

Fig. 2 is a top plan view of the same;

Fig. 3 is a view similar to Figure 1 but illustrating a slightly modified form of spring construction;

Fig. 4 is a side elevation of the same with the axle in section.

Referring to these drawings 5 is an I beam forming the front axle of the tractor, and having at each end thereof a knuckle joint 6, 6, extending from which are the stub shafts 7, 7, which support the naves of the opposite wheels of the vehicle or tractor.

Rising from the center of the axle 5 is one part of a pivoted bearing 8 upon which is supported a casting 9, having a bifurcated portion, between the forks 10, 10 of which is the pivoted member 8, and through all of which the bolt 11 is passed supporting the casting 9 in an upright position.

The casting 9 assumes the form of a yoke having two upwardly extending arms 12, 12 terminating in the spring brackets 13, 13.

Surrounding the brackets 13, 13, are tubular housing members 14, 14, open at the bottom and having an elongated slot 15 fitting over the arms of the bolster 12 whereby the brackets 13, 13, are engaged and supported inside of the housing 14.

Secured by bolts or otherwise to the housing members 14, 14, are side channels 15, 15, which form the rectangular supporting frame upon which is mounted the operative mechanism of the tractor.

Attached toward the outer extremities of the axle 5 are the brace bars, 16, 16. These bars are secured to said axle by a joint connection 17, (shown in Figure 4) which is preferably threaded through the channel of the axle, by the bolt 18. These bars extend rearwardly to a point on a longitudinal central line through the body of the tractor and are secured to a supporting member 19 by the anchor bolt 20.

21 is a transversely extending frame member positioned between the side channels 15, 15 and fixedly secured thereto.

Disposed within the housing 14, 14 are springs 22, which are seated upon the brackets 13 and which are designed to absorb the shock occasioned by the uneven surface over which the tractor may be traveling; also, with the pivotal bearing 11 the aforesaid springs assist in maintaining the supporting frame of the tractor in a horizontal plane.

In Figure 3 I have shown a modified form of construction in which the casting 9 is provided with the outwardly extending arms 12, 12, which terminate in the upper and lower bearing members 23, 24, each provided with an opening therethrough.

25, 25 are vertically extending bolts passed through said openings in the bearing members 23, 24 and around which are coiled springs 26, 26. Supported also on the bolts 25 are the retaining brackets 27, 27, preferably provided with flanges 28, 28 at the upper and lower edges thereof between which are bolted or otherwise secured the side channels 15ª of the frame.

From the foregoing it will be understood that the shock and vibration usually transmitted to the engine mechanism of a tractor will be practically arrested by the resilient members above described coacting with the front axle and bolster supporting the tractor body.

I claim:

1. An axle for motor vehicles, comprising an I-beam, knuckle joints at the ends thereof carrying wheel supports, a bearing member carried by said axle at the centre thereof, a bolster movably mounted on said bearing, the upwardly extending arms of said bolster terminating in spring brackets, a housing supported on each of said brackets and movable vertically thereon, resilient members positioned within said housing, and the vehicle frame secured to said housing and movable therewith.

2. An axle for motor vehicles, comprising a vehicle frame, an I-beam, knuckle joints at the ends thereof carrying wheel supports, a bearing member carried by said axle at the centre thereof, a bolster movably mounted on said bearing, the upwardly and outwardly curved arms on said bolster terminating in spring brackets, brackets on said frame members, and coiled springs between the brackets of the frame members and the brackets of the bolster.

In testimony whereof I have signed this specification.

NAHUM C. BEMENT.